3,632,567
ALKALI METAL SALTS OF 3-CYANO-1-[5'-CHLORO - 2' - (4" - CHLOROPHENOXY)-PHENYL]-TRIAZENE AND PROCESS FOR THEIR PREPARATION
Hasso Hertel, Offenbach am Main, Germany, assignor to Farbwerke Hoechst Aktiengesellschaft vormals Meister Lucius & Bruning, Frankfurt am Main, Germany
No Drawing. Filed June 24, 1968, Ser. No. 739,195
Claims priority, application Germany, June 23, 1967, F 52,771
Int. Cl. C07c 115/00
U.S. Cl. 260—140    4 Claims

ABSTRACT OF THE DISCLOSURE

A compound of the formula

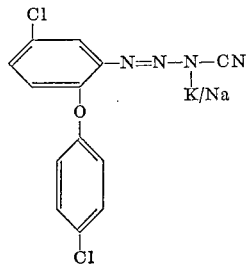

and a process for preparing.

---

The alkali metal salts of 3-cyano-1-aryl-triazenes corresponding to the formula

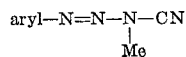

in which Me represents an alkali metal atom, are valuable intermediates for the manufacture of water-insoluble azo dyestuffs on the fibre. They are prepared according to the process described in the German specification No. 614,198 by coupling diazotized aromatic amines with cyanamide or its salts and separation as sodium, potassium, or calcium salt. When trying, according to one of the methods described in the aforesaid specification, to prepare the sodium salt of 3-cyano-1-[5'-chloro-2'-(4"-chlorophenoxy)-phenyl]-triazene, the compound is obtained in form of a viscous mass of honey-like nature which does not crystallize even after being kept for a prolonged period of time and which becomes solid only upon drying in a drying chamber or in an exsiccator. Big-scale production is therefore hardly possible. Though the potassium salt of this compound is obtained, when proceeding in an analogous manner, in a crystalline form, his form, however, is unfavorable for the application on an industrial scale. Thus, on separating the salt from the mother liquor, a filter cake is obtained which, because of its pasty consistency, brings about great difficulties on further manufacture. A long drying time is required and, because of the consistency, drying can only be effected on shelf driers, a method which demands very intense working because of the placing, turning over and lifting off which is done manually. After the drying, the compounds are present in form of solid lumps and crusts which have to be crushed by intense grinding. Moreover, the products thus obtained contain generally so many impurities that they must be recrystallized from water.

It has now been found that in the production of alkali metal salts of 3-cyano-1-[5'-chloro-2'-(4"-chloro-phenoxy)-phenyl]-triazene, the alkali metal salt is obtained in a form which is considerably more suitable for further production when being separated as potassium-sodium-salt. The molar ratio of potassium to sodium may vary within wide limits and ranges from about 9:1 to 3:7; a ratio of about 6:4 is particularly advantageous. It is hereby of no importance, whether the potassium and sodium ions are added simultaneously during the preparation, so that the desired potassium-sodium ratio is present throughout the different stages of the reaction, or whether they are added successively.

Coupling of diazotized 1-amino-5-chloro-2-(4'-chlorophenoxy)-benzene with cyanamide or its alkali metal salts is suitably effected at temperatures ranging from about —5 to +25° C. and at a pH in the range of from 7.5 to 13. It is of advantage to add sodium dinaphthylmethane disulfonate before, during or after coupling.

According to the process of the present invention, the triazene salt is obtained in form of thoroughly crystallized small bulbs of about 0.1 to 0.7 mm. diameter which, on being isolated by sucking off, pressing or centrifuging, yield a moist-crumbly press cake. The wet product thus obtained contains but little water and therefore needs only short drying times. It can be dried mechanically, such as for instance in disk or paddle driers, which hardly require any manual work. Moreover, the compounds obtained according to the process of the present invention do not cake together upon drying, but are available, after drying, in form of an incompact mass. This substance does not need to be ground to obtain marketable products. It is sufficient to mix it with standardizing agents in a mechanical mixer. The process of the present invention has the further advantage that, because of their low water content and their crumbly nature, the reaction products may be transformed ino a dry and stable article by simply mixing them with agents, which bind the water of crystallization, such as for instance anhydrous sodium acetate. To obtain almost quantitative yields according to the process of the present invention the use of an excess of about 10 mole percent of cyanamide will be sufficient.

The potassium-sodium salt of 3-cyano-[5'-chloro-2'-(4"-chlorophenoxy)-phenyl]-triazene obtained according to the process of the present invention shows in dry state, like all the alkali salts of 3-cyano-1-aryl-triazenes, a strong tendency to dust formation. In order to prevent this, since said dust provokes unpleasant physiological effects, a mixture of about equal parts of an aliphatic hydrocarbon of about 8 to 18 carbon atoms or of a mixture of such aliphtaic hydrocarbons, and of a salt of an alkylsulfonamido-alkyl carboxylic acid is added during the manufacturing process, best after coupling and before sucking off the compound. Particularly suitable is a mixture of mepasine and sodium mepasin-sulfonamido acetate. This mixture deposits on the crystals and thus preventing them from dusting. It is used in quantities of about 3 to 30 percent by weight, referred to the aromatic amine.

The following example serves to illustrate the invention but it is not bound to limit it thereto.

EXAMPLE 254 parts by weight of 1-amino-5-chloro-2-(4′-chlorophenoxy)-benzene are molten and added, while stirring well, to 950 parts by weight of 20% hydrochloric acid. The whole is then cooled to —5° C., and diazotization is effected by adding a concentrated aqueous solution of 70 parts by weight of sodium nitrite, the temperature during diazotization should not exceed 12° C. After a clarifying by filtration the diazo solution is poured, within 60 minutes, into a solution of 46 parts by weight of cyanamide and 10 parts by weight of sodium dinaphthylmethane disulfonate in 500 parts by weight of water. By adding simultaneously 60 parts by weight of sodium hydroxide and then 210 parts by weight of potassium hydroxide, both compounds being introduced in a concentrated aqueous solution, a pH of 10 is maintained, the temperature should hereby not exceed 10° C. When coupling is terminated, stirring is continued for one hour, in which proceeding the triazene salt, that at first had separated in an oily state and being dispersed in form of small droplets in the coupling liquor, becomes solid and then being available in form of small bulbs having a diameter of about 0.1 to 0.7 mm. Then, 25 parts by weight of a mixture consisting of about equal parts of mepasine and sodium mepasinsulfonamide acetate are added and stirring is continued for about 15 minutes. The separated potassium-sodium salt of 3-cyano-1[5′-chloro-2′-(4″-chlorophenoxy)-phenyl]-trizene is sucked off on a suction filter of 18 cm. diameter. The filter cake obtained is of crumbly nature and contains on the average 31% of moisture. The yield amounts to 91% of the theory.

In proceeding as described before using, however, exclusively potassium salts, a filter cake is obtained having a curdy consistency and an average moisture of 40%.

We claim:
1. A compound of the formula

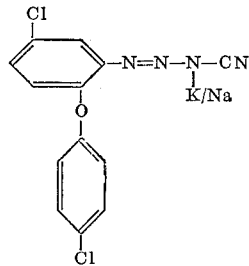

in which the molar ratio of potassium to sodium is in the range of from 9:1 to 3:7.

2. A compound as claimed in claim 1, in which the molar ratio of potassium to sodium is 6:4.

3. In a process for the preparation of alkali metal salts of 3-cyano-1-[5′-chloro-2′-(4″-chlorophenoxy)-phenyl]-triazene by coupling diazotized 1-amino-5-chloro-2-(4′-chlorophenoxy)-benzene with cyanamide or an alkali metal salt thereof, the improvement that comprises separating the triazine as potassium-sodium salt, the molar ratio of potassium to sodium being in the range of from 9:1 to 3:7, by adding both potassium and sodium ions to the coupling mixture.

4. The process according to claim 3 wherein the said potassium and sodium ions are added to the coupling mixture simultaneously or successively.

References Cited

UNITED STATES PATENTS

| | | | |
|---|---|---|---|
| 2,054,397 | 9/1936 | Taube | 260—140 |
| 3,453,066 | 7/1969 | Hertel | 260—140 X |

CHARLES B. PARKER, Primary Examiner

D. M. PAPUGA, Assistant Examiner